Dec. 9, 1941.   A. C. KORTE ET AL   2,265,809
MOTOR FIELD STRUCTURE
Filed Dec. 13, 1940

INVENTOR
ALFRED C. KORTE
KENNETH LANNERT
Donald U. Rich
ATTORNEY

Patented Dec. 9, 1941

2,265,809

UNITED STATES PATENT OFFICE 2,265,809

MOTOR FIELD STRUCTURE

Alfred C. Korte and Kenneth Lannert, St. Louis, Mo., assignors to Carter Carburetor Corporation, St. Louis, Mo., a corporation of Delaware Application December 13, 1940, Serial No. 370,000

3 Claims. (Cl. 172—36)

This invention relates to electric motors and more particularly to motor field structure.

In the production of motor field structures for small motors, the method of tying the field coils to retain their shape and of insulating them from the field frame upon assembly as generally practiced are tedious and costly operations.

It is an object of the present invention to provide a novel means of binding a field coil so as to hold it in shape.

It is a further object of the present invention to provide a binding means of the above character which renders the coil adaptable to expeditious assembly to the field frame, insulate it therefrom, and provide effective protection against abrasion of the coil at its contact points with the field frame.

Other objects and advantages will appear upon reference to the following description and accompanying drawing, referring to which:

Figure 1:
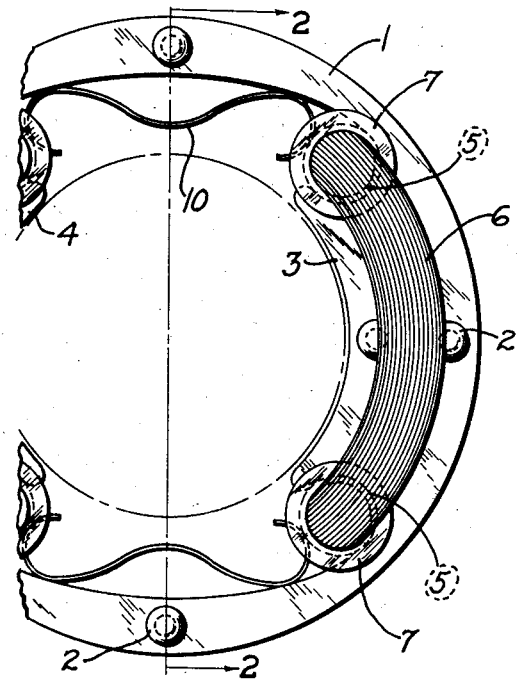
Fig. 1 is a face view in part of a motor field structure constructed in accordance with the present invention.
Figure 2:
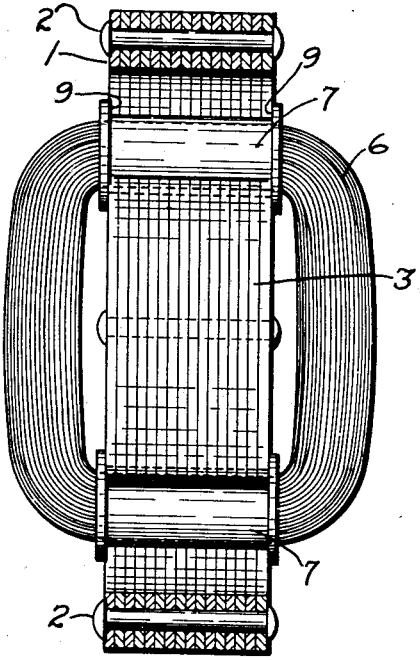
Fig. 2 is a sectional view taken on line 2—2 of Fig. 1.

Referring to Figs. 1 and 2, numeral 1 indicates a laminated field frame consisting of a stack of circular, flat, perforated iron stampings held together by the rivets 2. The perforations are so shaped as to form the projecting pole portions 3 and 4 and the semi-circular grooves 5 on either side thereof. Numeral 6 indicates a field coil assembled in the field frame. The coil 6 is provided at its ends with spool-shaped masses of rigid dielectric material 7 which forms a substantial shell around these portions of the coil and fills the interstices between the wires. This material is preferably one of the class of thermoplastics which may be molded by injection in a plastic state and which is sufficiently rigid for the present purpose at temperatures encountered in the present use.

Figure 3:
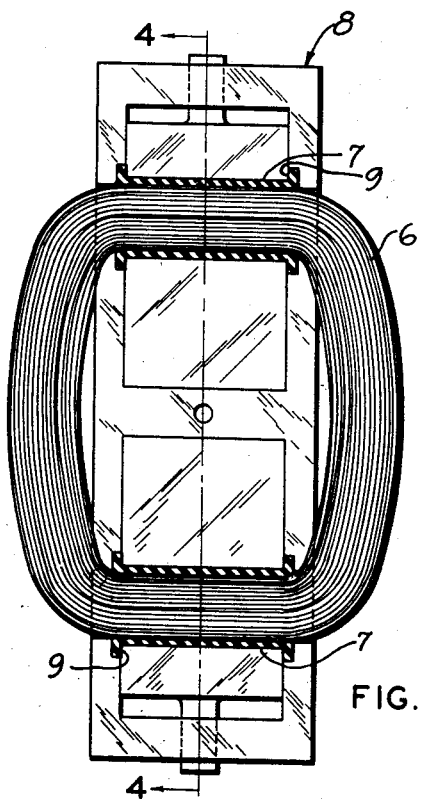
Fig. 3 shows the field coil and one-half of a mold for forming the insulating binder on the coil.
Figure 4:
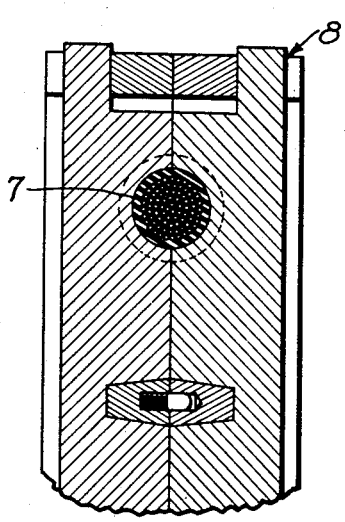
Fig. 4 is a fragmentary section taken on line 4—4 of Fig. 3.

The method of applying the insulating spool may be as indicated in Figs. 3 and 4 which comprises properly positioning the coil ends in the spool-shaped cavities of a suitable mold 8. The coils may be temporarily held in shape after winding and held in proper position in the mold by any suitable clamping means (not shown). The insulating mass is then injected into the mold cavities, in a plastic state under suitable pressure, and allowed to set. The coils 6 are wound straight and upon assembly to the field frame are pressed into the arc-shape indicated in Fig. 1 which shortens the distance from center to center of the spools 7 thereby firmly holding the spools in the grooves 5. The flanges 9 of spools 7 are so spaced as to nicely span the frame stack thus preventing their axial movement. After assembly of the coils in the field frame, suitable spring clips 10 are pressed into place as indicated in Fig. 1, thus firmly retaining the spools in the bottoms of grooves 5.

From the foregoing it will be seen that I have provided a unique means of binding field coils so as to retain their shape and prevent their uncoiling, that said means further provides adequate installation and protection against abrasion for those portions of the coil which would, otherwise, come in contact with the field frame, and have provided a novel and expeditious manner of assembling and retaining the field coil in the field frame. The description and accompanying drawing are intended to be illustrative and not limiting and the exclusive use of all modifications within the scope of the appended claims is contemplated.

We claim:

1. Motor field structure comprising a field frame having a pole portion projecting radially therefrom, a field coil comprising a plurality of closely laid loops of insulated wire, a pair of spool-shaped masses of insulating material surrounding diametrically opposite portions of said coil, and semi-circular grooves on opposite sides of said pole portions adapted to receive said spools, the length of said spools between flanges being substantially equal to the thickness of said pole portions whereby axial motion of said spools is prevented.

2. Motor field structure comprising a circular field frame having a pole portion projecting radially therefrom, a field coil comprising a plurality of closely laid loops of insulated wire, a pair of spool-shaped masses of molded insulating material surrounding and binding said coil at oppositely spaced points, a pair of semi-circular grooves one on each side of said pole portion adapted to receive the shank portions of said spools, the length of said spools between flanges being substantially equal to the thickness of said pole portion, and spring clips for retaining said spools in the bottoms of said grooves.

3. In an electric motor, a stator having semi-circular grooves extending therethrough for receiving field coils, and loop formed field coils having spool shaped masses of molded insulating material surrounding portions thereof and firmly bonded thereto, the shank portions of said spools being adapted to neatly fit said semi-circular grooves and the flanges of said spools being spaced to nicely fit the thickness of said stator whereby axial movement of the spools and loop is prevented.

ALFRED C. KORTE.
KENNETH LANNERT.